Figure 3:
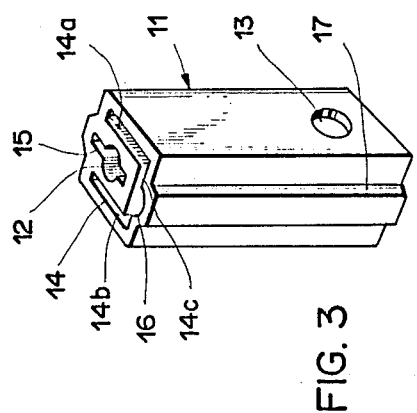

United States Patent [19]

Cosandier

[11] Patent Number: 4,839,987

[45] Date of Patent: Jun. 20, 1989

[54] PROP SUPPORT FOR PLANTS GROWN IN BOXES

[76] Inventor: Paul-André Cosandier, 10, ch. de Tolochenaz 1110 Morges, Vaud, Switzerland

[21] Appl. No.: 89,090

[22] Filed: Aug. 25, 1987

[30] Foreign Application Priority Data

Aug. 29, 1986 [CH] Switzerland .................. 3465/86

[51] Int. Cl.⁴ .......................................... A01G 9/12
[52] U.S. Cl. .................................. 47/70; 47/47; 248/213.2; 248/231.2
[58] Field of Search ............................. 47/44–47, 47/70; 403/233, 230, 244; 248/514, 519, 521, 523, 525, 416, 419, 188.4, 188.5, 188.7, 347, 354.3, 213.2, 231.2, 558

[56] References Cited

U.S. PATENT DOCUMENTS

| 500,140 | 6/1893 | Kruger | 47/70 |
| 909,808 | 1/1909 | Laughterback | 248/354.3 |
| 2,126,766 | 8/1938 | Gerbermann | 47/41.11 |
| 2,345,455 | 3/1944 | Brumfield | 47/47 |
| 3,026,649 | 3/1962 | Barakauskas | 47/70 |
| 3,165,863 | 1/1965 | Duran | 47/70 |

FOREIGN PATENT DOCUMENTS

| 1943926 | 3/1971 | Fed. Rep. of Germany . | |
| 3439790 | 4/1986 | Fed. Rep. of Germany | 47/47 |
| 2519513 | 7/1983 | France | 47/70 |
| 2524256 | 10/1983 | France | 47/70 |
| 2541076 | 8/1984 | France . | |
| 301362 | 11/1954 | Switzerland | 47/70 |
| 408516 | 9/1966 | Switzerland . | |

Primary Examiner—Danton D. DeMille
Attorney, Agent, or Firm—Oliff & Berridge

[57] ABSTRACT

An adjustable support assembly comprises two clamping parts, an extensible bar, and a connection piece, these components being independent of one another. The extensible bar, composed of a tubular element and a threaded rod screwed into a nut integral with the tubular element, supports the connection piece and presses the two clamping parts against opposite walls of the container. The support facilitates the affixing of trellises, hoops, and other types of props for plants growing in window boxes or other containers.

7 Claims, 1 Drawing Sheet

U.S. Patent

Jun. 20, 1989

4,839,987

PROP SUPPORT FOR PLANTS GROWN IN BOXES

This invention relates to equipment for growing plants, and more particularly to a device for supporting a prop for growing plants in containers.

Patent documents FR 2,541,076, CH 408,516, and DE 1,943,926 describe devices for fixing vertical props intended to hold up plants in pots. However, when plants are grown in oblong containers such as window boxes, holding means or props of quite different construction and appearance are often used. Such props, which may be trellises, expansible frameworks, hoops, assemblies of jointed rods, etc., play a part in the attractiveness and originality of presentation of the plants, so that their size, the materials of which they are made, and their appearance are essentially variable.

It is an object of this invention to provide a simple, improved suppot capable of being adapted to props and holding means of various types and also to containers of differents shapes and sizes, such as elongated boxes of plastic, wood, or composite material, having parallel or inclined longitudinal walls, etc.

To this end, the supporting device according to the present invention comprises one or more assemblies of elements, each assembly of which is made up of two clamping parts, an extensible bar, and one or more connection pieces sliding on the bar, these elements being arranged so as to be fixed by the pressure of the extensible bar on the clamping elements and by the pressure of the latter against opposite walls of the container, as well as by the fitting of an end portion of a prop into each connection piece.

Figure 2:
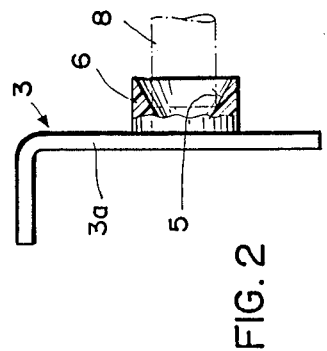
Figure 1:
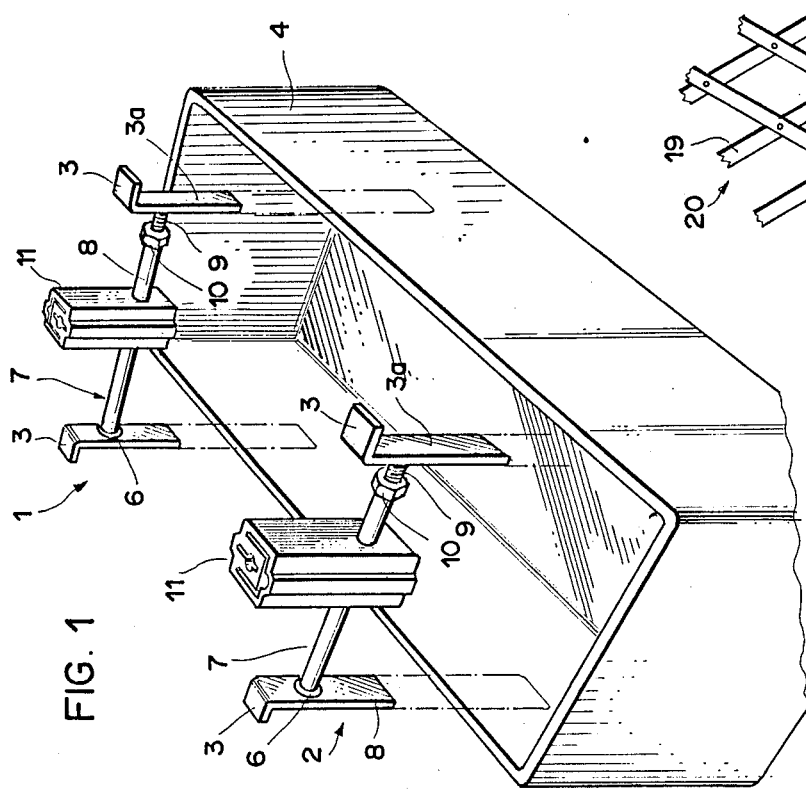
Figure 4:
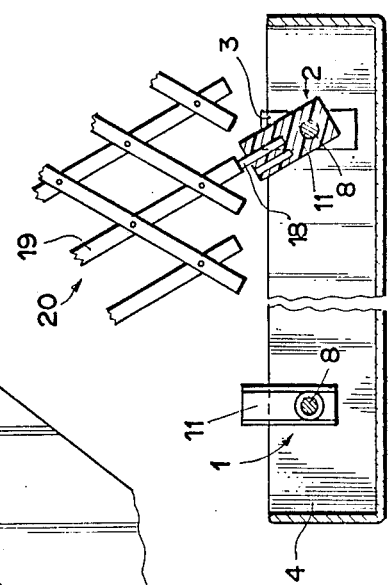

A preferred embodiment of the invention will now be described in detail with reference to the accompanying drawings, in which:

FIG. 1 is a diagrammatic perspective view of a window box equipped with a support comprising two adjustable assemblies, FIG. 2 is a sectional view of a clamping part on a larger scale, FIG. 3 is a perspective view of a connection piece, and FIG. 4 is a partial longitudinal section through a window box equipped with the support.

As shown in the drawings, the support comprises two adjustable assemblies 1 and 2 made up of independent and similar elements. In each adjustable assembly there are two L-shaped clamping parts 3 intended to lie flat against the inside surface of a longitudinal wall of a window box 4. As may be seen in FIG. 2, each clamping part 3 includes, on the side thereof facing the interior of window box 4, a socket 5 bounded by an annular rib 6 of triangular cross-section, so that socket 5 is conical and admits either end of an extensible bar 7 constituting a further element of each of the assemblies 1 and 2. This shape of sockets 5 makes it possible to insert extensible bars 7 of different diameters, to eliminate or reduce the play between the ends of the bars 7 and the conical walls of sockets 5, and to use identical clamping parts 3 for receiving the ends of bars 7 of different sizes. Hence there is no expense incurred for machining the ends of these extensible bars. It will further be noted that it is possible to insert in conical sockets 5 the ends of extensible bars 7 which are not positioned at right angles to clamping parts 3, while nevertheless retaining the same advantages as described above. Thus, clamping parts 3 may be placed against inclined walls or vertical walls.

When an assembly is mounted, the L shape of each clamping part 3 allows it to be hung over the edge of the window box, thereby automatically adjusting both sockets 5, and hence the locations where the ends of bars 7 should be situated, to the same level. This avoids any slipping down toward the bottom of window box 4 and considerably facilitates installation. It will likewise be noted that the face 3a of each clamping part 3 may additionally be covered with a non-slip coating or a piece of double-sided adhesive tape.

Each extensible bar 7 is composed of a guide tube 8 and a sliding rod 9, one end of which is inserted in the associated tube 8. Rod 9 is threaded and fits into a nut 10 integral with one end of tube 8. With this arrangement, bar 7 can be immobilized in a position where both ends of it press against clamping parts 3, as indicted above. A spiral spring might be inserted into tube 8 instead, in order to press against rod 9. To increase the possibilities of extension of bar 7, threaded rods might be affixed to both ends of each tube 8.

Each adjustable assembly further comprises a connection piece 11 which is movable relative to the bar 7 bearing it. Connection piece 11 can rotate about and slide longitudinally along tube 8, so that a trellis, for example, can be placed either in the center of window box 4 or in a position closer to either of its long sides. Each connection piece 11 is an elongated rigid part of standard dimensions, having a certain cross-section and a number of cavities and slots for adapting it to different uses. As shown in FIG. 3, for example, a connection piece 11 may include the following cross-sectional elements: a circular hole 12 passing through connection piece 11 along its longitudinal axis, so that a screw can be fitted in the connection piece for fastening it to some surface, for instance. Hole 12 may instead receive the end of a prop or any other cylindrical part. Connection piece 11 also comprises a transverse hole 13 for fitting it on bar 7. Hole 13 may likewise be used for fixing connection piece 11 to a wall by means of screw or some other means of attachment.

In the upper end face of connection piece 11 there are several slots or cavities extending to a certain depth. FIG. 3 shows a U-shaped slot 14 and an axial slot 15 passing through hole 12. The dimensions of these two slots may vary, so that, for example, U sections 2 mm thick, up to 18 mm wide, and up to 15 mm deep can be fitted into connection piece 11. These slots also make it possible for connection piece 11 to receive and hold flat pieces 3 mm thick by means of side 14a of U-shaped slot 14, pieces 4 mm thick by means of side 14b of slot 14, or pieces 5 mm thick by means of slot 15. In the embodiment illustrated, a cavity 16 situated in side 14c of slot 14 can receive round bars 4 mm in diameter, while hole 12 can receive bars 7 mm in diameter. Finally, as may be seen in FIG. 3, connection piece 11 includes, on two opposite sides, cuts 17 of rectangular cross-section so that it may be inserted in a tube of rectangular cross-section having inside ribs matching the outside ribs of connection piece 11.

Connection piece 11 may be used alone, without the other elements of the assemblies described, or together with other connection pieces, for other applications as in the following examples.

Two connection pieces 11, for instance, each fixed to two stakes driven into the earth, will hold a trellis directly over the soil.

By attaching a connection piece 11 to each end of a U-shaped bar having an overall length which, including the connection pieces 11, is 1 cm shorter than a given floor-to-ceiling height in a room, this bar can be held by screwing the connection piece at one end to the floor, by means of a screw fitted into opening 12, and sliding the other connection piece toward the ceiling and screwing it there.

Turning again to the application previously described, comprising two assemblies 1 and 2 of adjustable elements, mounted on a window box 4, FIG. 4 shows the two connection pieces 11 held in an inclined position by the insertion of studs 18, integral with parts 19 of an extensible trellis 20. The two studs 18 suffice to keep trellis 20 in a rigid, inextensible position while immobilizing the independent elements of the two adjustable assemblies 1 and 2.

In the preferred embodiment, the clamping parts and the connection piece are made of plastic, while the extensible bar comprises a metal part and a tubular part of composite glass-polyester material.

What is claimed is:

1. A plant support comprising more than one assembly supporting a propping means within a container for growing and supporting plants comprising two assemblies for supporting said propping means, each assembly comprising two clamping elements, each of which is provided with a contact surface which engages a corresponding surface of an inner wall of the container, an extensible bar having a pair of ends, the extensible bar being mounted between said two clamping elements and at least one connection piece slidingly disposed on said extensible bar and provided with means for attaching at least one part of said propping means, each of said two clamping elements further including on a side facing the other clamping element a socket for receiving one end of said extensible bar, each of said ends being freely located in said sockets, said sockets being bounded by a circular rib of triangular cross-section and having conical inside walls.

2. A plant support comprising more than one assembly supporting a propping means within a container for growing and supporting plants comprising two assemblies for supporting said propping means, each assembly comprising two clamping elements, each of which is provided with a contact surface which engages a corresponding surface of an inner wall of the container, an extensible bar mounted between said two clamping elements and at least one connection piece slidingly disposed on said extensible bar and provided with means for atatching at least one part of said propping means, each of said connection pieces comprising a rigid, sectional element provided with a transverse hole for receiving said extensible bar, said means for attaching the propping means includes at least one cavity, and a U-shaped slot having two arm portions and a transverse portion , the two arm portions and the transverse portion each being of elongated rectangular shape and being of different widths.

3. The device of claim 2, wherein each of said connection pieces is of substantially rectangular cross-section and includes two longitudinal ribs running along the centers of two opposite sides.

4. The device of claim 1, wherein each of said cavities include a central cavity of rectangular cross-section positioned between the two arms of said U and parallel thereto.

5. The device of claim 4, wherein each of said connection pieces further comprises a cylindrical hole disposed in the center of said central cavity, the diameter of said hole being greater than the width of said central cavity.

6. The device of claim 5, wherein each of said connection pieces further comprises an arcuate widened portion disposed at the center of the transverse portion of said U-shaped slot.

7. The device of claim 1, wherein said clamping elements and said connection pieces are of plastic and said extensible bar comprises a metal portion and a tubular portion of composite glass-polyester material.

* * * * *